US010609265B2

(12) United States Patent
Pandit et al.

(10) Patent No.: US 10,609,265 B2
(45) Date of Patent: Mar. 31, 2020

(54) METHODS AND APPARATUS FOR SYNCHRONIZING CAMERA FLASH AND SENSOR BLANKING

(71) Applicant: QUALCOMM Incorporated, San Diego, CA (US)

(72) Inventors: Nishant Pandit, San Diego, CA (US); Nathaniel Jay Tobias Salazar, San Diego, CA (US); Jeyaprakash Soundrapandian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/490,517

(22) Filed: Apr. 18, 2017

(65) Prior Publication Data

US 2018/0213141 A1    Jul. 26, 2018

Related U.S. Application Data

(60) Provisional application No. 62/451,003, filed on Jan. 26, 2017.

(51) Int. Cl.
*H04N 5/225* (2006.01)
*H04N 5/235* (2006.01)

(52) U.S. Cl.
CPC ......... *H04N 5/2256* (2013.01); *H04N 5/2258* (2013.01); *H04N 5/2354* (2013.01)

(58) Field of Classification Search
CPC .. H04N 5/2357; H04N 5/2256; H04N 5/2258; H04N 5/2354; H04N 5/247
See application file for complete search history.

(56) References Cited

U.S. PATENT DOCUMENTS

| 2007/0285514 | A1  | 12/2007 | Perlman et al. |
| 2012/0081566 | A1* | 4/2012  | Cote ............... H04N 5/2256 348/222.1 |
| 2012/0188440 | A1  | 7/2012  | Takeuchi |
| 2013/0057740 | A1  | 3/2013  | Takaiwa |
| 2014/0125864 | A1  | 5/2014  | Rihn et al. |

(Continued)

OTHER PUBLICATIONS

International Search Report and Written Opinion—PCT/US2017/067041—ISA/EPO—dated Feb. 19, 2018.

(Continued)

*Primary Examiner* — Twyler L Haskins
*Assistant Examiner* — Fayez Bhuiyan
(74) *Attorney, Agent, or Firm* — QUALCOMM Incorporated

(57) ABSTRACT

An aspect of this disclosure is an apparatus for capturing an image. The apparatus comprises an image sensor configured to capture an image of a field of view. The apparatus also comprises a flash component configured to illuminate at least a portion of the field of view at a power level during capture of a first frame by the image sensor. The apparatus further comprises a controller. The controller is configured to determine a flash ramp-up time for the flash component, the flash ramp-up time corresponding to an amount of time between a flash being requested at the power level and the flash component producing the flash at the power level. The controller is also configured to blank the image sensor for a blanking period during the flash ramp-up time.

32 Claims, 9 Drawing Sheets

(56) References Cited

U.S. PATENT DOCUMENTS

2014/0240492 A1* 8/2014 Lee ...................... H04N 5/2256
                                                        348/136
2016/0261807 A1   9/2016 Seshadrinathan et al.
2018/0288294 A1* 10/2018 Falk ...................... G03B 15/05

OTHER PUBLICATIONS

Williams J., et al., "Simple Circuitry for Cellular Telephone/Camera Flash Illumination", Linear Technology Corporation, Application Note 95, Mar. 2004, pp. AN95-1-AN9512.

* cited by examiner

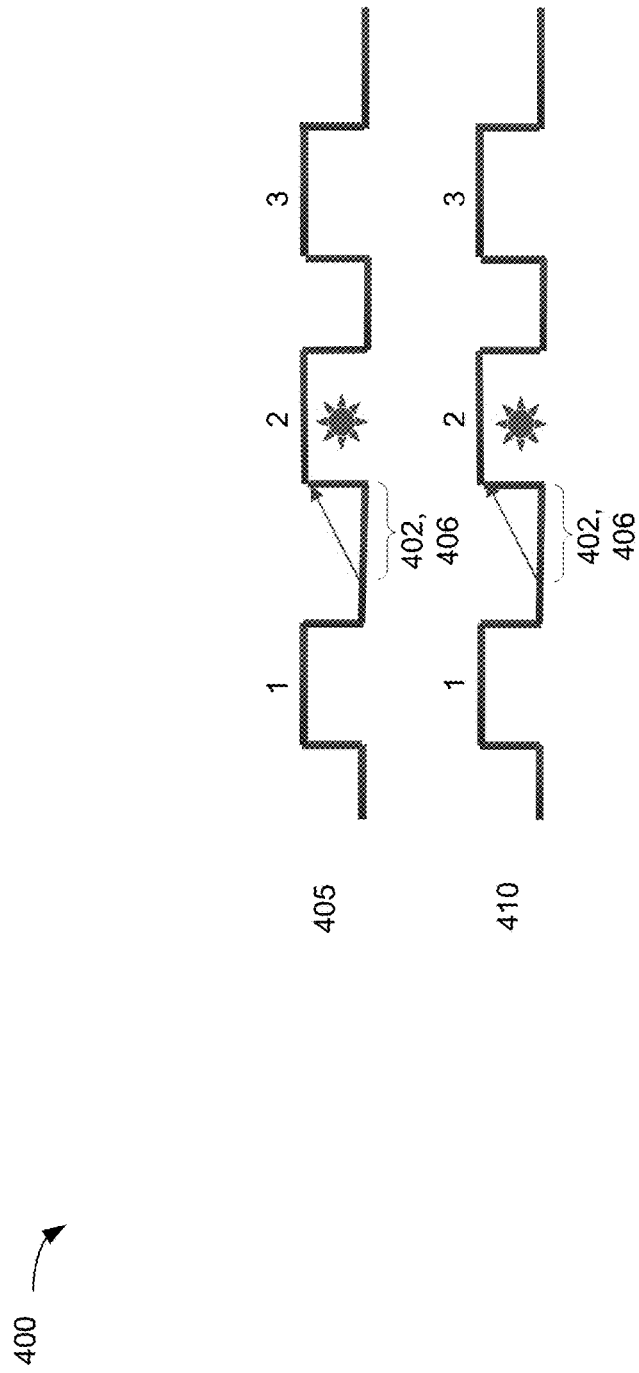

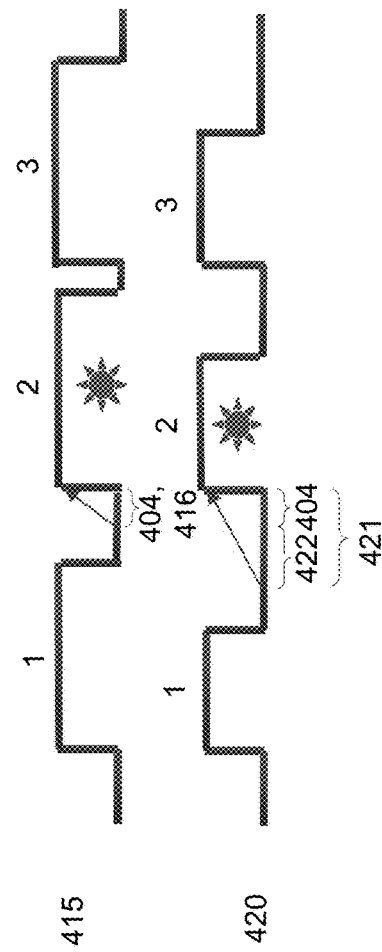

METHODS AND APPARATUS FOR SYNCHRONIZING CAMERA FLASH AND SENSOR BLANKING

CROSS-REFERENCE TO RELATED APPLICATIONS

This Application claims priority to U.S. Provisional Application No. 62/451,003 entitled "METHODS AND APPARATUS FOR SYNCHRONIZING CAMERA FLASH AND SENSOR BLANKING" filed Jan. 26, 2017, the disclosure of which is hereby expressly incorporated in its entirety by reference herein.

BACKGROUND

Field

This disclosure generally relates to providing synchronized camera flash and camera sensor blanking in photographic and/or other image capture devices.

Description of the Related Art

Users often experience events which they would like to capture in a photograph or video using an imaging device, and view at a later date and/or time, for example, a child's first steps or words, a graduation, or a wedding. Often, these events may be near—static and their occurrence generally predictable (e.g., a landscape, a portrait, etc.) and may be easily captured using any imaging device or system, e.g., a camera, video recorder, or smartphone, without concern of proper exposure durations or flash and sensor synchronization. In some instances, unlimited power reserves may make knowledge of flash ramp up times unnecessary. However, sometimes capturing dynamic scenes may present a challenge, especially if the imaging device has limited power reserves.

Even when the imaging device captures an image of the event at the proper moment, the imaging device may waste energy in activating the flash too early, may provide insufficient flash to properly illuminate the scene, or may overexpose one or more frames, making them unusable for viewing and/or analysis. Accordingly, methods and apparatuses for ensuring a flash of appropriate power values impacts only a target frame and synchronizing such flash control across multiple flash modules of a single or multiple sensor imaging device are desirable.

SUMMARY

Various implementations of methods and devices within the scope of the appended claims each have several aspects, no single one of which is solely responsible for the desirable attributes described herein. Without limiting the scope of the appended claims, some prominent features are described herein.

An aspect of this disclosure is an apparatus for capturing an image. The apparatus comprises an image sensor configured to capture an image of a field of view. The apparatus also comprises a flash component configured to illuminate at least a portion of the field of view at a power level during capture of a first frame by the image sensor. The apparatus further comprises a controller. The controller is configured to determine a flash ramp-up time for the flash component, the flash ramp-up time corresponding to an amount of time between a flash being requested at the power level and the flash component producing the flash at the power level. The controller is also configured to control a blanking of the image sensor for a blanking period during the flash ramp-up time.

Another aspect of this disclosure is a method of capturing an image by a camera. The method comprises determining a flash ramp-up time for a flash component of the camera. The method also comprises illuminating at least a portion of a field of view of the camera. The method further comprises blanking an image sensor of the camera for a blanking period during the flash ramp-up time. The method also further comprises capturing an image of the field of view.

An additional aspect of this disclosure is an apparatus for capturing an image. The apparatus comprises means for illuminating at least a portion of a field of view of the apparatus. The apparatus also comprises means for determining a flash ramp-up time for the means for illuminating. The apparatus also further comprises means for capturing an image of the field of view. The apparatus further comprises means blanking the means for capturing an image for a blanking period during the flash ramp-up time.

An additional aspect of this disclosure is a non-transitory, computer-readable storage medium. The medium comprises code executable to determine a flash ramp-up time for a flash component of a camera. The medium further comprises code executable to illuminate at least a portion of a field of view of the camera. The medium also comprises code executable to blank an image sensor of the camera for a blanking period during the flash ramp-up time. The medium also further comprises code to capture an image of the field of view.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

FIG. 4A illustrates an example of an exposure and flash timing diagram of the camera of FIG. 2 having multiple symmetric sensors synchronized with the flash, in accordance with an exemplary embodiment.

FIG. 4B illustrates an example of an exposure and flash timing diagram of the camera of FIG. 2 having multiple asymmetric sensors synchronized with the flash, in accordance with an exemplary embodiment.

DETAILED DESCRIPTION

Figure 1:
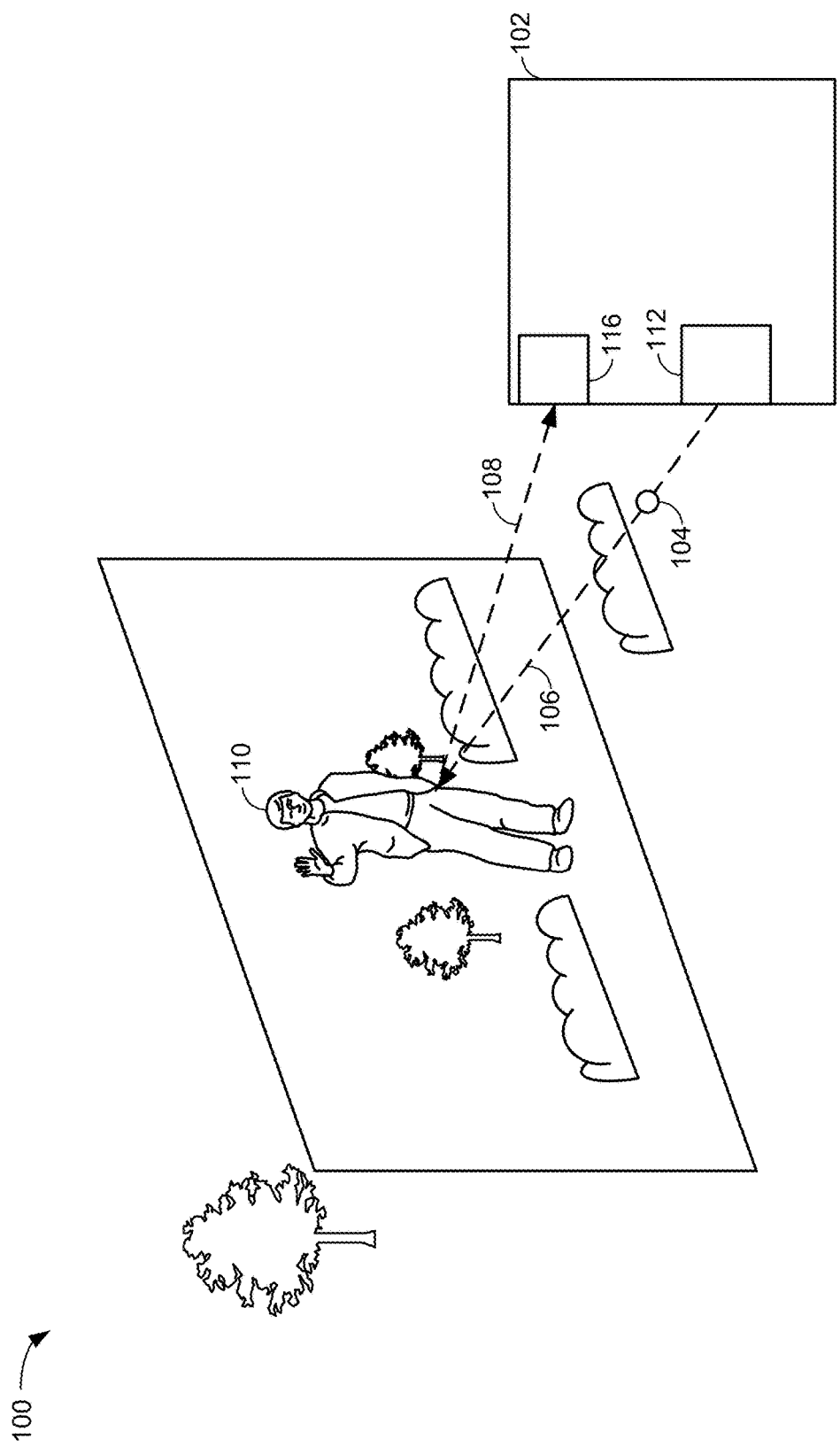
FIG. 1 is a diagram illustrating an example of a camera capturing an image of a field of view (FOV), in accordance with an exemplary embodiment.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and may fully convey the scope of the disclosure to those skilled in the art. The scope of the disclosure is intended to cover aspects of the systems, apparatuses, and methods disclosed herein, whether implemented independently of, or combined with, any other aspect of the invention. For example, an apparatus may be implemented or a method may be practiced using any number of the aspects set forth herein. In addition, the scope of embodiments of the invention, including those described herein, is intended to cover such an apparatus or method which is practiced using other structure, functionality, or structure and functionality in addition to or other than the various aspects of the embodiments set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to various imaging and photographic technologies, system configurations, computational systems, flash systems, and exposure determination systems. The Detailed Description and drawings are intended to be illustrative of the disclosure of embodiments of the invention, rather than limiting.

In photography, when a user is using an imaging device (or camera) in a manual mode (or any other mode), the user may actively control what the imaging device is focused on and may select various characteristics (e.g., aperture, shutter speed, "film" speed) that control the exposure. This allows the imaging device to capture an image nearly instantaneously when the user activates a control interface to capture an image since no focusing or exposure may need be determined and/or performed by the imaging device itself. Alternatively, when an imaging device is used in an automatic focus ("autofocus") and an automatic exposure mode, before an image is captured, the imaging device is configured to determine a correct exposure and perform an autofocus process. Additionally, in either of these scenarios, the imaging device may need to coordinate one or more flash modules (flash modules) of the imaging device with one or more image sensors of the imaging device. The imaging device may coordinate the flash modules with the one or more sensors to reduce wasted energy when the flash modules are activated. The coordination of the flash modules with the sensors may also allow the imaging device to properly capture a target frame without resulting in partially exposed frames (preceding or following the target frame). In some embodiments, the manual mode (or any other mode) may provide the user options to establish or control coordination or synchronization settings between the flash modules and the one or more sensors of the imaging device. This disclosure relates to controlling synchronization of flash ramp-up times and exposure of camera sensors in a photographic device.

As imaging devices become more complex and include multiple imaging sensors and/or multiple flash modules, control of the imaging devices to produce properly illuminated and properly fused images via budgeted power constraints are desired. For example, in more advanced imaging device configurations, a dual image sensor configuration may comprise two active sensors, one sensor being associated with or having "wide angle" optics and the other being associated with or having "telephoto" optics. In some embodiments, the multiple imaging sensors configuration may include a plurality of asymmetric sensors with different optics and different FOVs (e.g., one sensor with telephoto optics and FOV and one sensor with wide angle optics and FOV). Accordingly, the image sensors may not be identical, with non-identical sensors having different characteristics in various embodiments. Images captured by both the sensors may be used fused together to form a combined snapshot, combining the perspectives of both the sensors.

Additionally, as imaging devices are integrated into other devices (e.g., phones, vehicles, computers, etc.) or as the imaging devices become more portable, the power consumption of the flash modules may become constrained. Additionally, synchronization of the flash modules with the one or more image sensors may be critical for varied reasons. For example, in a single sensor device, the synchronization between the flash modules and the single sensor may provide for use of feedback from preceding frames to assist in an appropriate capture of the target frame. In some embodiments, the preceding frame(s) may provide additional scene information that is utilized in post-processing to filter out ambient light flicker or combining frames (e.g., ChromaFlash, etc.). In some embodiments, the statistics that may be consumed from the preceding frame(s) by an algorithm for the next frame may include Bayer exposure statistics, Bayer histogram statistics, row sum, and column sum for the preceding frame(s). In some embodiments, preflash automatic exposure correction (AEC) estimation may be performed and the AEC may be locked for a main flash, instead using the estimated values. However, if AEC is operating in auto mode, we can use the feedback from the preceding frame(s) and update the AEC parameters for the target frame. For example, this may be useful in moving scenes with varying lighting conditions.

In multiple sensor devices, the flash modules must be synchronized between the multiple sensors to allow for the captured image from each sensor of the multiple sensors to be appropriately fused with each of the captured images from the other sensors of the multiple sensors. In imaging devices comprising multiple flash modules, each flash module may have a different flash timing profile. Accordingly, each flash module may comprise a different load and/or quality to be considered.

Accordingly, when comprising a combination of one or more flash modules and one or more image sensors, the desired imaging device may synchronize the flash module and the image sensor to eliminate partially exposed frames preceding and following the target frame. The desired imaging device may also control the flash modules based on one or more of flash ramp-up or ramp-down times specific to the flash module and dynamically track and update the flash ramp-up and/or ramp-down times during operation. Additionally, the desired imaging device may synchronize single or multiple flash modules with single or multiple image sensors.

As the imaging devices advance and different applications and architectures are developed, different combinations and types of sensors and/or flash modules may be utilized. For example, an active-light based 3D scanner may utilize an RGB sensor in combination with an NIR sensor. Some imaging devices may include different color flash modules. Accordingly, synchronization between the flash modules and sensors may become challenging.

In a CMOS sensor using electronic rolling shutter, individual lines of a frame are captured one at a time. Accordingly, exposure of each line of the frame starts and ends at different times. Individual reset and read signals are generated for each line by the sensor. A periodicity or timing of the read signals (corresponding to when the data accumulated in each line of the sensor during exposure is read out) may be maintained across all lines of the frame while the periodicity or timing of the reset signal may be adjusted based on desired exposure levels of each line. However, the discussion contained herein should not be specific to CMOS sensors and may be extended to other sensor technologies. The exposure time of each line may be determined by parameters of the sensor. Accordingly, different (or asymmetric) sensors may have different exposure times.

Different exposure times of different sensors (e.g., tele and wide) may comprise the sensors beginning exposure at different times, ending exposure at different times, or continuing exposure for different durations. The frame rate of the different sensors may be matched or in multiples of each other to provide for proper fusion. Additionally, for proper fusion, the start of exposure for the two sensors may be matched. The sensors may be symmetric or asymmetric.

In some embodiments, an exposure time (or sensor integration time or shutter time) may be measured in linecounts, lc. A sensor frame length line (FLL) may include a number of active lines and a number of virtual lines with no pixel data and may adjust a frame time of the sensor. In a multi-sensor camera, exposure (start, end, etc.) of frames for the multiple sensors may be synchronized by hardware or software or by default (e.g., if the sensors are identical or symmetric sensors). A frame rate of the multi-sensor camera may be synchronized by adjusting the FLL. In some embodiments, the FLL may include both active lines and blank lines.

In multiple sensor imaging devices, synchronization may ensure that the multiple sensors are capturing the same target object or scene at the same time. This synchronization will not be discussed herein with exception to any relationships to synchronizing sensors with the flash modules of the imaging device. In low light scenes, the exposure time for each line may be similar in duration as the frame time. Accordingly, blanking may be minimal in such conditions when the flash module is activated. Accordingly, the readout of a first frame may be closely aligned with an exposure of a second frame. Generally, Frame time ($T_{frame}$) is greater than or equal to an exposure time for the frame. If the exposure time exceeds the frame time, as likely in low light conditions, the additional exposure time may be offset by increasing the FLL to match the exposure time. Increasing the FLL may mean increasing frame blanking because there are no existent pixels being added.

FIG. 1 is a diagram illustrating an example of a camera capturing an image of a field of view (FOV), in accordance with an exemplary embodiment. In some embodiments, the image capture device 102 may comprise the 3D scanner mentioned above. In some embodiments, the image capture device 102 may comprise a single sensor device. The image capture device 102 may correspond with the imaging device described herein. As shown here, the image capture device 102 is a camera (or scanner) that includes a single sensor 116 (e.g., an RGB sensor). For clarity of description, both an image capture device and a camera will be referred to as the "camera" 102 in the context of this description. The camera 102 may be any device capable of capturing a still or moving image, regardless of format (digital, film, etc.) or type (video camera, still camera, web camera, etc.). The camera 102 is configured to capture images using the sensor 116 (or multiple sensors, not shown here) of a target object 110 or target scene. For clarity of description, both a target scene and a target object 110 will be referred to as the "target object" 110 in the context of being the subject matter that the camera 102 is focused on.

As shown, the camera 112 comprises a flash (e.g., light source, light emitter, or light module) 112. The flash 112 may be incorporated in the camera 102 (e.g., built-in) or coupled to the camera 102. In some embodiments, the light emitter 112 is separate from the camera 102, e.g., it is not integrated into or structurally attached to the camera 102.

The embodiment of FIG. 1 illustrates emitted light 104 from the flash 112 propagating along a path 106 that represents the path of light from the flash 112 to the target object 110. FIG. 1 also illustrates a reflected light 108 which may represent the light or the reflected path of the light that illuminates the target object 110 (for example, from flash 112) and reflects from the target object 110 to a sensor 116. In some embodiments, the flash 112 and the light sensor 116 may be two components that are configured to operate together, as part of a single component (e.g., part of a near infrared (NIR) sensor). The sensor 116 may be configured to capture an image of the target object 110 based on the reflected light 108. In some embodiments, the RGB sensor 116 may be replaced with one or more other types of sensors.

Figure 2:
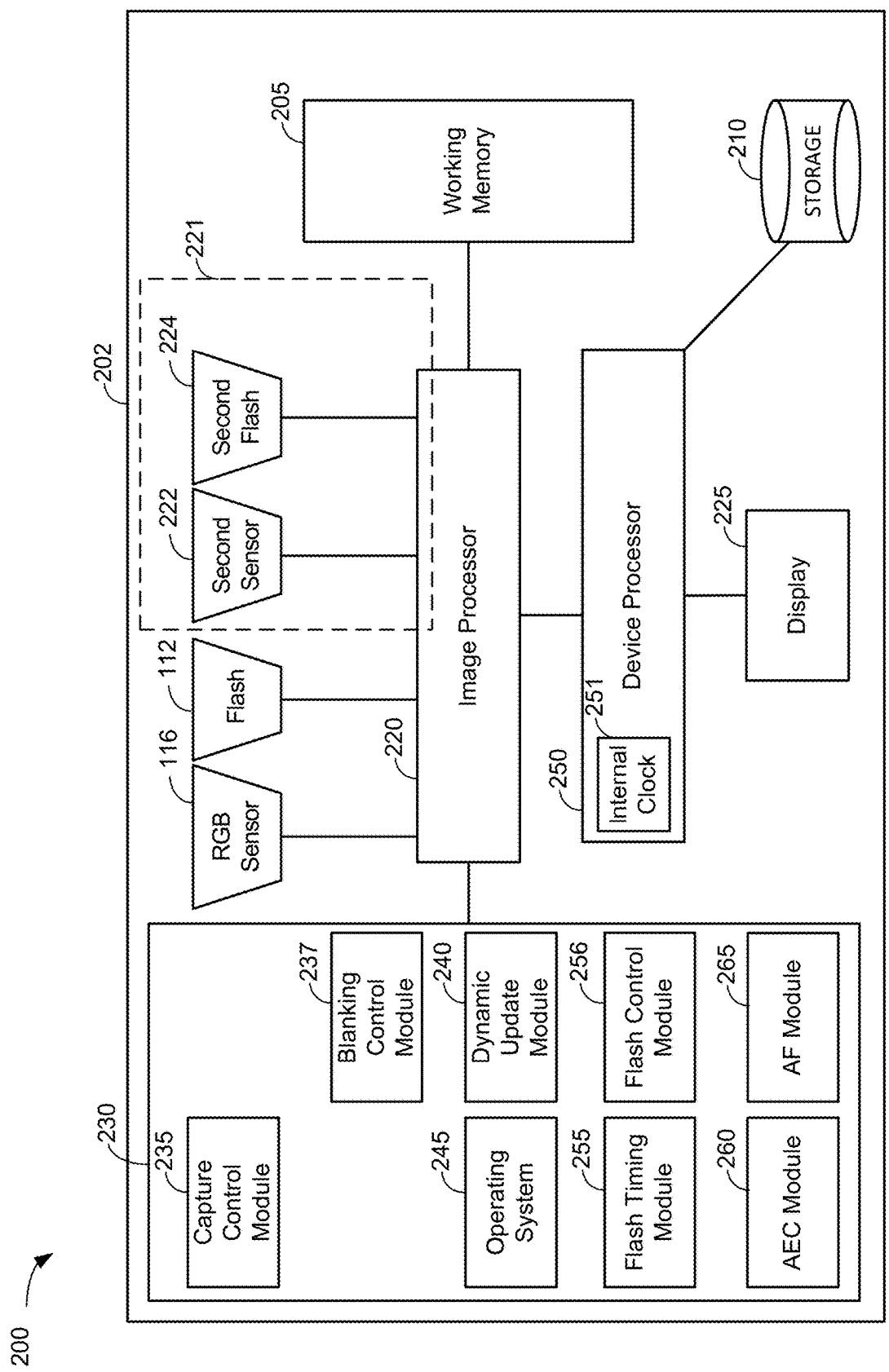
FIG. 2 is a block diagram illustrating an example of one embodiment of a camera, the camera comprising a plurality of flashes and sensors and including blanking and flash controls, in accordance with an exemplary embodiment.

FIG. 2 is a block diagram illustrating an example of one embodiment of a camera, the camera comprising a plurality of flashes and sensors and including blanking and flash controls, in accordance with an exemplary embodiment. The camera 202 may correspond to the camera 102 of FIG. 1. The camera 202 has a set of components including an image processor 220 linked to the RGB sensor 116 and to a flash 112 (or other light source). In some embodiments, the image processor 220 may be further linked to optional equipment 221 comprising a second image sensor 222 (e.g., another RGB sensor or another type of sensor) and a second flash 224. In some embodiments, the camera 202 may include W/T modules, modules with three or more sensors or cameras having different fixed optical lengths, a combination of one or more of each of RGB and monochrome sensors (for example, Qualcomm Clear Sight technology or modules), modules having differently sized sensors, or any other combination of image sensors and/or modules. The image processor 220 may be further linked to a working memory 205 and a memory 230 that may comprise one or more modules that assist in controlling operation of the camera 202.

The image processor 220 may also be in communication with a device processor 250, which in turn may be in communication with an electronic storage module 210 and a display 225 (for example an electronic LED or touchscreen display). In some embodiments, one or more inputs or outputs (I/O, not shown) may be coupled one of the image processor 220 and the device processor 250. In some embodiments, a single processor may comprise both the image processor 220 and the device processor 250 instead of two separate processors as illustrated in FIG. 2. In some embodiments, one or both of the image processor 220 and the device processor 250 may comprise a clock 251, shown in FIG. 2 as integrated within the device processor 250. Some embodiments may include three or more processors. In some embodiments, additional processors dedicated to the RGB sensor 116 or the flash 112 (or the optional components 221) may be included. In some embodiments, some of the components described above may not be included in the camera 202 or additional components not described above may be included in the camera 202. In some embodiments, one or more of the components described above or described as being included in the camera 202 may be combined or integrated into any other component of the camera 202.

The camera 202 may be, or may be part of, a cell phone, digital camera, tablet computer, personal digital assistant, laptop computer, personal camera, action camera, mounted camera, connected camera, wearable device, automobile, drone, or the like. The camera 202 may also be a stationary computing device or any device in which one or more sensors and one or more flashes are integrated. In some embodiments, the camera 202 may comprise or be coupled to an energy source. For example, when the camera 202 is a standalone device, the camera 202 may include its own power source. When the camera 202 is integrated or part of another component, the camera 202 may share the power source with the other component.

A plurality of applications may be available to the user on the camera 202. These applications may include traditional photographic and video applications, high dynamic range imaging, panoramic photo and video, or stereoscopic imaging such as 3D images or 3D video. In some embodiments, these applications may be stored in one of the working memory 205 and the storage module 210 and may utilize one or more modules in the memory 230.

Still referring to FIG. 2, the camera 202 includes the RGB sensor 116 or the sensor 222 for capturing images of the target object 110 in view of ambient lighting or light from the flash 112 or the flash 224. The camera 202 may include at least one optical imaging component (not shown) that focuses light received from the field of view (FOV) of the camera 202 to the RGB sensor 116. The AF module 265 may couple to the at least one optical imaging component. The AEC module 260 may couple to one or both of the at least one optical imaging component and the RGB sensor 116. In some embodiments, the RGB sensor 116 may be replaced with one or more other sensors. The RGB sensor 116 may be coupled to the image processor 220 to transmit a captured image of the field of view to the image processor 220. In this embodiment, signals to and from the RGB sensor 116 may be communicated through the image processor 220.

The camera 202 may include the flash 112. In some embodiments, the camera 202 may include the plurality of flashes 112 and 224. The flashes 112 and 224 may each (or both) correspond to a flash module or component, which may include associated components and circuits that allow the flash module to emit light in response to a flash command and power from an energy source (not shown). For example, the flash module may include a light emitting component and a capacitor that temporarily stores charge for the light emitting component. The flashes 112 and 224 may include, for example, a flash bulb, a reflector, a geometric light pattern generator, and/or an LED flash. The image processor 220 or a dedicated flash control module 256 can be configured to receive and transmit signals from/to the flashes 112 and 224 to control the flash output.

As illustrated in FIG. 2, the image processor 220 is connected to the memory 230 and the working memory 205. In the illustrated embodiment, the memory 230 may be configured to store the capture control module 235, a blanking control module 237, a dynamic update module 240, the operating system 245, a flash timing module 255, the flash control module 256, the AEC module 260, and the AF module 265. Additional modules may be included in some embodiments, or fewer modules may be included in some embodiments. These modules may include instructions that configure the image processor 220 to perform various image processing and device management tasks. The working memory 205 may store a working set of processor instructions or functions contained in one or more of the modules of the memory 230. The working memory 205 may also store dynamic data (e.g., data created by the dynamic update module 240) created during the operation of the camera 202 (e.g., synchronization timings between the flashes 112 and 224 and the RGB sensor 116 and the second sensor 222). While additional modules or connections to external devices or hardware may not be shown in this figure, they may exist to provide other exposure, focus, and image capture adjustment and estimation options or actions.

As mentioned above, the image processor 220 may be configured by or may be configured to operate in conjunction with one or more of the several modules stored in the memory 230. The capture control module 235 may include instructions that control the overall image capture functions of the camera 202. For example, the capture control module 235 may include instructions that configure the image processor 220 to capture raw image data of the target object 110 of FIG. 1. In some embodiments, the capture control module 235 may interface with the I/O to receive commands from the user and/or provide feedback to the user. The capture control module 235 may also be configured to activate the flashes 112 and 124 when capturing the raw image data. In some embodiments, the capture control module 235 may control exposure and/or readout of raw image data from one or both of the RGB sensor 116 and the second sensor 222. In some embodiments, the capture control module 235 may be configured to store the captured raw image data in the electronic storage module 210 or to display the captured raw image data on the display 225. In some embodiments, the capture control module 235 may direct the captured raw image data to be stored in the working memory 205. In some embodiments, the capture control module 235 may call one or more of the other modules in the memory 230, for example the blanking control module 237, the flash control module 256, the AEC module 260 or the AF module 265. In some implementations, the capture control module 235 may call the flash control module 256 to determine and implement a flash level (e.g., flash power) of one or both of the flashes 112 and 224 or to synchronize their operation in image capture. In some implementations, the capture control module 235 may operate in conjunction with the blanking control module 237 and the flash timing module 255 to implement sensor blanking of one or both of the RGB sensor 116 and the second sensor 222 based on a flash ramp-up or ramp-down time of at least one of the flashes 112 and 224.

The blanking control module 237 may control blanking of one or more of the RGB sensor 116 and the second sensor 222. Blanking of an image sensor may comprise a period of time between when exposure of a first frame ends and when exposure of the subsequent (second) frame begins. Accordingly, blanking may be extended when a delay is introduced before the exposure of the second frame begins, thus increasing the period of time between the exposure of the first frame and the second frame. In some embodiments, the blanking may be reduced. Accordingly, the blanking control module 237 may delay exposure or read out of one or both of the RGB sensor 116 and the second sensor 222. In some embodiments, the blanking control module 237 may be controlled by one of the capture control module 235 and the operating system 245. In some embodiments, the blanking control module 237 may control the capture control module 235, delaying exposure or read out of one or both of the RGB sensor 116 and the second sensor 222 according to the needed blanking.

The dynamic update module 240 may be configured to update one or more flash ramp-up or ramp-down times for one or both of the flashes 112 and 224 that are stored in a database of flash ramp-up and/or ramp-down times. In some embodiments, the dynamic update module 240 may be configured to calculate one or more of the ramp-up and ramp-down times based on one or more parameters of the flash command, parameters of the corresponding flash 112 and 224, and/or an overall system load. In some embodiments, the dynamic update module 240 may be integrated with a feedback system or signal that allows the dynamic update module 240 to track a time between when a flash output is requested to when the flash reaches fully lit power. In some embodiments the feedback system or signal may indicate when the flash reaches the requested power output level.

The flash timing module 255 may identify and/or determine a flash ramp-up or ramp-down time based on a desired or requested flash output level (e.g., a pre-flash illumination level or a main flash illumination level, where the main flash illumination level is greater than the pre-flash illumination level). Additionally, the flash ramp-up or ramp-down time may be further determined based on one or more of a current draw of the flashes 112 and 224, which may depend on parameters of the flash elements (e.g., LED parameters, quantity of flash elements, etc.) and the overall load of the camera 202 and the available energy in the power source. In some embodiments, determining the flash ramp-up or ramp-down time may comprise looking up the time in a look-up table based on the parameters described herein. For example, the requested flash output level and the parameters of the flashes 112 and 224 may be inputs that indicate a particular ramp-up time and a particular ramp-down time in the lookup table. In some embodiments, the lookup table may be stored in one of the memories 230 or 205 or the storage module 210.

In some embodiments, the flash timing module 255 may communicate a signal to one of the dynamic update module 240, the blanking control module 237, the capture control module 235, the flash control module 256, and the memory where the lookup table is stored. For example, the signal may indicate the determined flash ramp-up or ramp-down time.

The flash control module 256 may be configured to control the flashes 112 and 224. In some embodiments, the flash control module 256 may receive a command to provide the flash from one or both of the flashes 112 and 224 and signal to the flashes 112 and 224 to activate accordingly. In some embodiments, the flash control module 256 may provide the desired flash level to the flashes 112 and 224 and allow them to regulate their output accordingly. In some embodiments, the flash control module 256 may request a particular amount of power from the energy source for the flashes 112 and 224. In some embodiments, the flash control module 256 may track at time between when the command is provided to the flashes 112 and 224 and when the flashes 112 and 224 reach their desired output levels. In some embodiments, the flash control module 256 may be configured to perform one or more operations of the flash timing module 255 or the dynamic update module 240.

The AEC module 260 may comprise instructions that allow the image processor 220, the device processor 250, or a similar component to calculate, estimate, or adjust the exposure of one or both of the RGB sensor 116 and the second sensor 222 and, thus, of the camera 202. For example, the AEC module 360 may be configured to independently determine the exposure values of one or both of the RGB sensor 116 and the second sensor 222. The AEC module 260 may include the instructions allowing for exposure estimations. Accordingly, the AEC module 260 may comprise instructions for utilizing the components of the camera 202 to identify and/or estimate exposure levels. Additionally, the AEC module 260 may include instructions for performing local automatic exposure control for each of the RGB sensor 116 and the second sensor 222. In some embodiments, each of the RGB sensor 116 and the second sensor 222 may comprise individual AEC modules (not shown). In some embodiments, the AEC module or modules 260 may determine the exposure value for the associated sensor or sensors. The exposure values may be fed or programmed into the sensors for the next line. The determined exposure values may also be communicated to the timing adjustment module 255 via one or more of the image processor 220, the device processor 250, or another processor. In some embodiments, the AEC module 260 may be configured to identify an exposure value of the associated sensor or sensors for a subsequent frame or line. In some embodiments, the AEC module 260 may further comprise instructions for synchronizing the RGB sensor 116 and the second sensor 222 at one or more identified or estimated exposure levels.

Still referring to FIG. 2, the operating system 245 may configure the image processor 220 to manage the working memory 205 and the processing resources of camera 202. For example, the operating system 245 may include device drivers to manage hardware resources such as the RGB sensor 116, the second sensor 222, the flash 112, the second flash 224, and the various memory, processors, and modules. Therefore, in some embodiments, instructions contained in the processing modules discussed above and below may not interact with these hardware resources directly, but instead interact with this hardware through standard subroutines or APIs located in the operating system 245. Instructions within the operating system 245 may then interact directly with these hardware components. The operating system 245 may further configure the image processor 220 to share information with device processor 250. The operating system 245 may also include instructions allowing for the sharing of information and resources between the various processing modules of the camera 202. In some embodiments, the processing modules may be hardware themselves.

The AF module 265 can include instructions that configure the image processor 220 to adjust the focus position of the one or more optical imaging components of the RGB sensor 116 and the second sensor 222. The AF module 265 can include instructions that configure the image processor 220 to perform focus analyses and automatically determine focus parameters in some embodiments, and can include instructions that configure the image processor 220 to respond to user-input focus commands in some embodiments. In some embodiments, the AF module 265 may include instructions for identifying and adjusting the focus of the optical imaging components based on light emitted from the flashes 112 and 224. In some embodiments, the AF module 265 may be configured to receive a command from the capture control module 235, the AEC module 260, or from one of the image processor 220 or device processor 250.

In FIG. 2, the device processor 250 may be configured to control the display 225 to display the captured image, or a preview of the captured image including estimated exposure and focus settings, to a user. The display 225 may be external to the camera 202 or may be part of the camera 202. The display 225 may also be configured to provide a viewfinder displaying the preview image for the user prior to capture the image of the target object, or may be configured to display a captured image stored in the working memory 205 or the electronic storage module 210 or recently captured by the user. The display 225 may include a panel display, for example, a LCD screen, LED screen, or other display technologies, and may implement touch sensitive technologies. The device processor 250 may also be configured to control the I/O to receive an input from the user or provide an output. For example, the display 225 may also be configured to be a touchscreen, and thus may be configured to receive an input from the user. The user may use the display 225 to input information that the device processor 250 may provide to the modules of the memory 230 (e.g., the AEC module 260 or the AF module 265. For example, the user may use the touchscreen to select the target object from the FOV shown on the display 225 or set or establish the exposure levels and focus settings of the camera 202. The device processor 250 may receive that input and provide it to the appropriate module, which may use the input to select perform instructions enclosed therein (for example, determine the focus of the target image at the AF module 265, etc.).

In some embodiments, the device processor 250 may be configured to control the one or more of the processing modules in the memory 230 or to receive inputs from one or more of the processing modules in the memory 230.

The device processor 250 may write data to the electronic storage module 210, for example data representing captured images. While the electronic storage module 210 is represented graphically as a traditional disk device, in some embodiments, the electronic storage module 210 may be configured as any storage media device. For example, the electronic storage module 210 may include a disk drive, such as a floppy disk drive, hard disk drive, optical disk drive or magneto-optical disk drive, or a solid-state memory such as a FLASH memory, RAM, ROM, and/or EEPROM. The electronic storage module 210 can also include multiple memory units, and any one of the memory units may be configured to be within the camera 202, or may be external to the camera 202. For example, the electronic storage module 210 may include a ROM memory containing system program instructions stored within the camera 202. The electronic storage module 210 may also include memory cards or high speed memories configured to store captured images which may be removable from the camera.

Although FIG. 2 depicts a device 202 having separate components to include a processor, imaging sensor, and memory, in some embodiments these separate components may be combined in a variety of ways to achieve particular design objectives. For example, in an alternative embodiment, the memory components may be combined with processor components to save cost and improve performance.

Additionally, although FIG. 2 illustrates a number of memory components, including the memory 230 comprising several processing modules and a separate memory comprising a working memory 205, in some embodiments, different memory architectures may be utilized. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the image processor 220. In some embodiments, one or more of the processing modules may be software stored in the memory 230 or may comprise a hardware system combined with the software components. Furthermore, functions associated above with one of the image processor 220 and the device processor 250 may be performed by the other of the image processor 220 and the device processor 250 or both the image processor 220 and the device processor 250, though not described as such above.

In some embodiments, the image processor 220 may be further configured to participate in one or more processing operations prior to capturing an image, while capturing an image, and after capturing an image. For example, prior to capturing the image, the image processor 220 may be configured to perform one or more of the processes described above (e.g., estimating and adjusting the exposure and the focus of the camera 202). In some embodiments, the image processor 220 may be configured to, in conjunction with one or more of the flashes 112 and 224, the flash timing module 255, the AEC module 260, and the AF module 265, adjust the exposure and the synchronization of the RGB sensor 116 and the second sensor 222 and the flashes 112 and 224. The image processor 220 may thus be configured to enable the camera 202 to capture an image of the target object or FOV with proper settings (exposure and focus) as desired by the user.

In some embodiments, the image processor 220 may be involved with and/or control the determination and dynamic updating of ramp-up and/or ramp-down times of the flashes 112 and 224. For example, the image processor 220 may receive the delay values from the flash timing module 255 and cause the blanking of one or both of the RGB sensor 116 and the second sensor 222.

Alternatively, or additionally, the image processor 220 may only act in response to instructions from one or more other components or modules of the camera 202. For example, the flash timing module 255, the AEC module 260, or the AF module 265 may issue instructions to other components of the camera 202 to allow the flash timing module 255 and the blanking control module 237 to determine and implement the blanking for one or both of the RGB sensor 116 and the second sensor 222, to allow the AEC module 360 to calculate exposure values for the RGB sensor 116 and the second sensor 222 as described above, or to allow the AF module 365 to calculate the estimated focus as described above. Additionally, statistics may be collected using various hardware (such as an image signal processor (ISP)) based on the image data from the sensor at real time. For example, the collected statistics may be sums and averages of all regions on a certain size grid, such as 64×48. The collected statistics may also include histograms of the image data.

In some embodiments, any one of the components of the camera 202 shown in FIG. 2 may be configured to work in combination with or control any other of the components of the camera 202. In some embodiments, any combination of the components may be combined into a single component (not shown).

Many image capture devices (e.g., cameras and camcorders, etc.) utilize electronic rolling shutter image capture methods. Rolling shutter methods capture a frame of the FOV by scanning across the scene rapidly, either vertically or horizontally, over a brief period of time. Accordingly, not all parts of the image of the scene are captured at exactly the same instant, meaning that distortions may be generated when a portion of the FOV or target is in motion.

In the electronic rolling shutter capture methods, exposure of each line or row of pixels of the sensor begins and ends at different times. Each line or row has its own reset and read signals that are generated by the sensor control system. Once a sensor starts being exposed and read out, the read signal preserves sensor timing. However, the reset signal may be moved forward and backward in relation to the readout signal to control exposure times of each line.

Figure 3A:
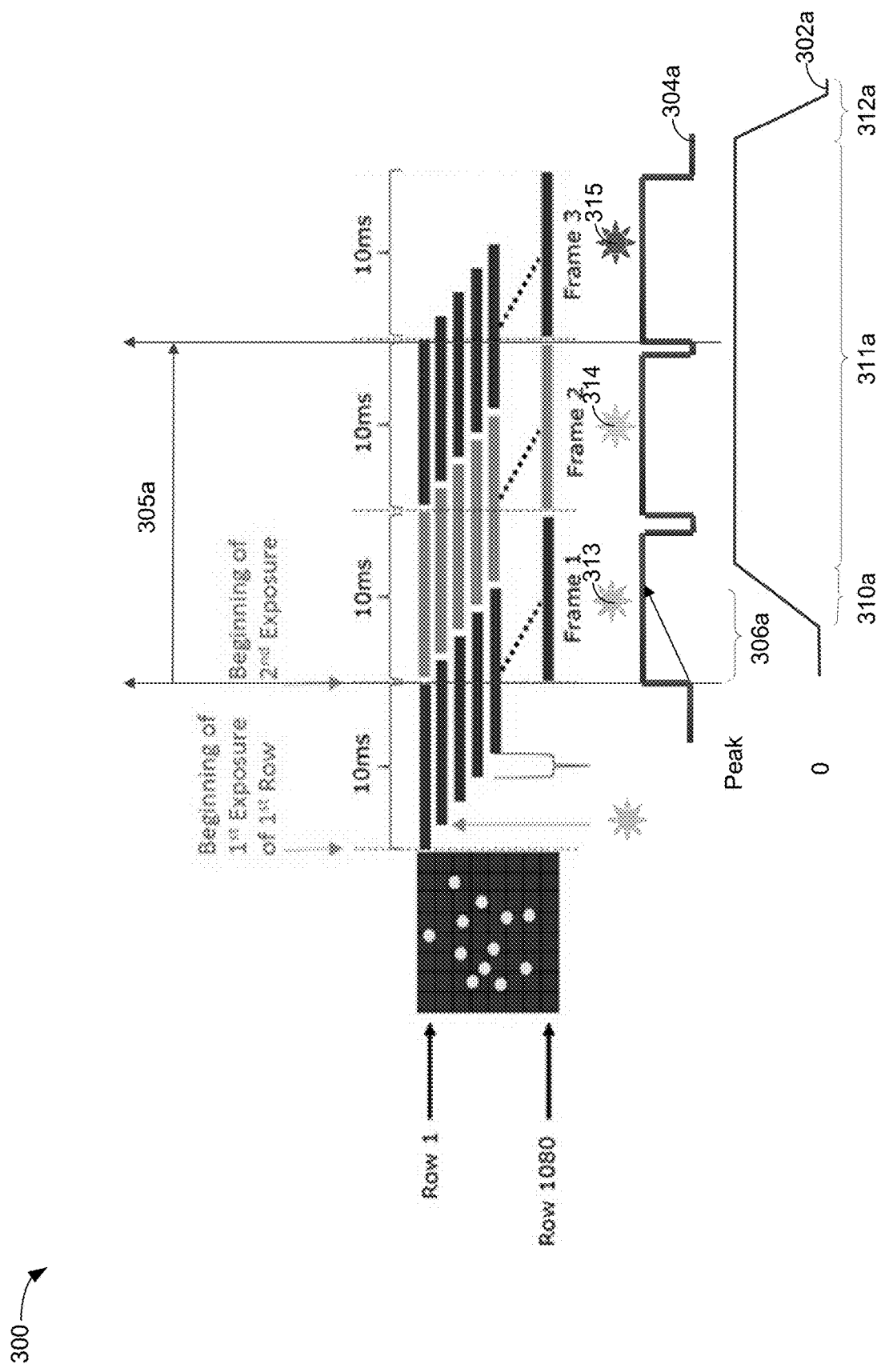
FIG. 3A illustrates an exposure and flash timing diagram for the camera of FIG. 1, where neither the exposure of the sensor nor the activation of the flash are synchronized, in accordance with an exemplary embodiment.

FIG. 3A illustrates an exposure and flash timing diagram for the camera of FIG. 1, where neither the exposure of the sensor nor the activation of the flash are synchronized, in accordance with an exemplary embodiment. The exposure and flash timing diagram 300 shows, for an exemplary frame comprising 1080 rows or lines, when a first exposure of a first row of the first frame begins and ends in association with second and third exposures of first rows of the second and third frames. The exposure and flash timing diagram 300 shows that each row of the first, second, and third frames is exposed for 10 ms.

The exposure and flash timing diagram 300 includes an LED current indicator 302a. The LED current indicator may depict a ramp-up period 310a, an active flash period 311a, and a ramp-down period 312a of the flash 112. The ramp-up period 310a includes the period from when the flash 112 is first requested (e.g., LED current begins) to the time when the LED current reaches its peak (requested) value. The active flash period 311a includes the period from when the flash 112 reaches its peak LED current to the time when the flash 112 begins to turn off (the LED current begins to decrease). The ramp-down period 312a include the period from when the flash 112 begins to turn off to the time when the LED current reaches a zero value.

The diagram 300 also includes a frame exposure signal 304a corresponding to exposure periods of corresponding frames. The frame exposure signal 304a may be low when no frame is exposed and may be high when frames 2, 3, and 4 are exposed. Accordingly, the frame exposure signal 304a indicates that the flash 112 turns on and ramps-up after frame 1 is exposed but while frame 2 is exposed.

Directly above the frame exposure signal 304a are illumination indicators for each frame indicated by the frame exposure signal 304a. The illumination indicators indicate an illumination of the frame being read out simultaneously to the frame shown as being exposed according to the frame exposure signal 304a. For example, the illumination indicator 313 indicates that the frame 1, being read out while the frame 2 is exposed, was not at all illuminated. Similarly, the illumination indicator 314 indicates that the frame 2, being read out while the frame 3 is exposed, is partially illuminated. The illumination indicator 315 indicates that the frame 3, being read out while the frame 4 is exposed, is fully illuminated.

The diagram 300 further includes a time $T_{flash}$ 306a (corresponding to the flash ramp-up period 310a) that is shown beginning when the flash 112 is triggered at the start of exposure of frame 2 and ends when the LED current indicator 302a reaches its peak current value. Additionally, the diagram shows a period 305a during which the flash 112 is active (including ramp-up, active, and ramp-down periods) such that the frame 3 is fully illuminated (as indicated by the illumination indicator 315).

Figure 3B:
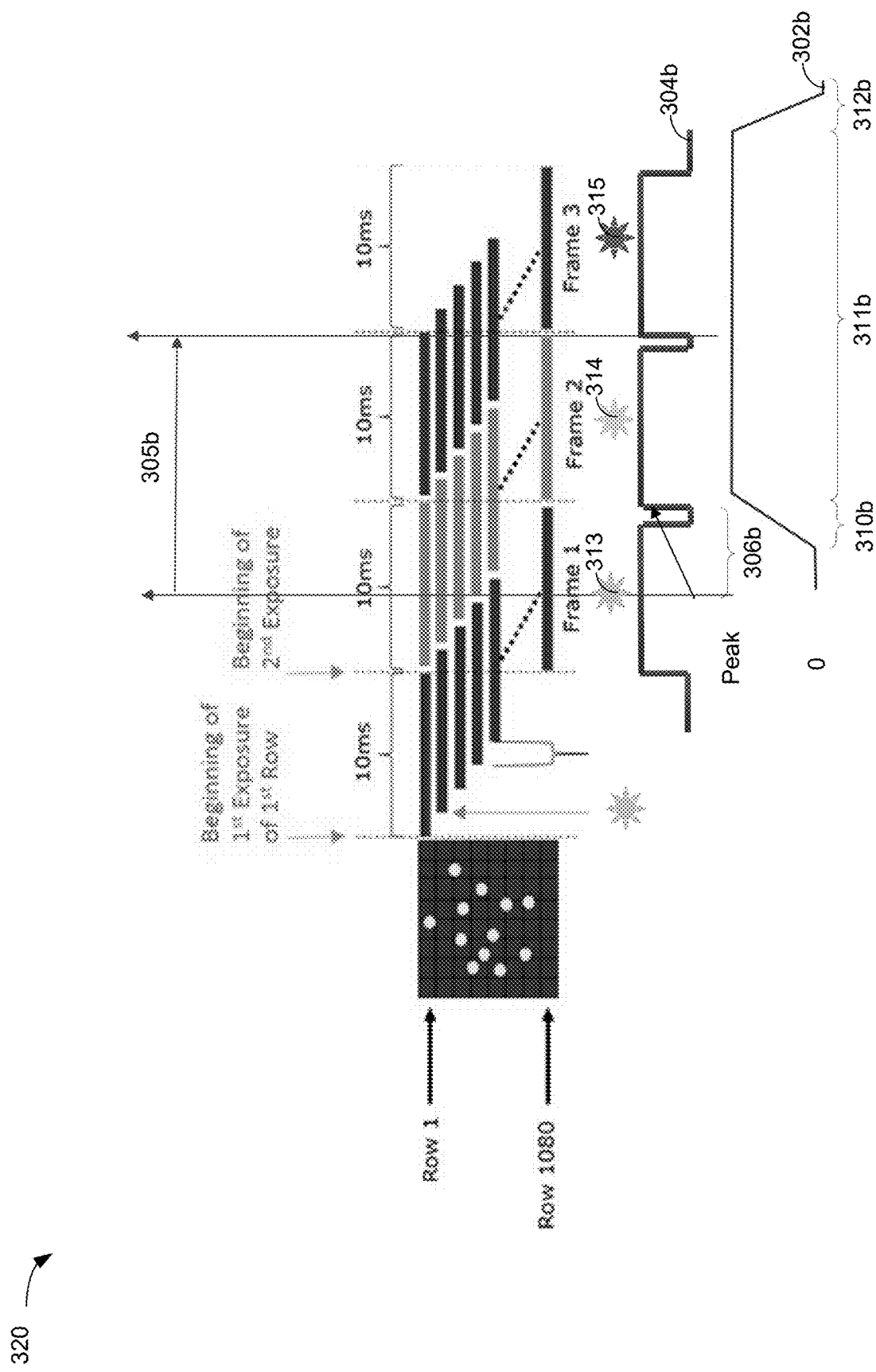
FIG. 3B illustrates an exposure and flash timing diagram for the camera of FIG. 1, where the exposure of the sensor is not synchronized with the flash but the flash is synchronized with a target frame, in accordance with an exemplary embodiment.

FIG. 3B illustrates an exposure and flash timing diagram for the camera of FIG. 1, where the exposure of the sensor is not synchronized with the flash but the flash is synchronized with a target frame, in accordance with an exemplary embodiment. The exposure and flash timing diagram 320 shows, similar to the diagram 300, when a first exposure of a first row of the first frame begins and ends in association with second and third exposures of the second and third frames.

The exposure and flash timing diagram 320 includes an LED current indicator 302b (corresponding to the LED current indicator 302a of FIG. 3A and including a ramp-up period 310b (corresponding to the ramp-up period 310a), an active flash period 311b (corresponding to the active flash period 311a), and a ramp-down period 312b (corresponding to the ramp-down period 312a)) of the flash 112 and a frame exposure signal 304b (corresponding to exposure periods of frames 2, 3, and 4, similar to the frame exposure signal 304a) similar to diagram 300. For sake of simplified description, such similar components and indicators will not be described again here. The diagram 320 shows that the frame exposure signal 304b indicates that the flash 112 turns on and ramps-up after frame 1 is exposed but while frame 2 is exposed, similar to the diagram 300, even though the flash 112 is coordinated to start at the time $T_{flash}$ 306b prior to the desired activation point of the beginning of exposure of frame 3. Accordingly, the illumination indicator 313 indicates that the frame 1, being read out while the frame 2 is exposed, was not at all illuminated, but that frame 2 is partially illuminated and frame 3 is fully illuminated. Additionally, the period 305b of the diagram 320 is reduced as compared to the period 305a of the diagram 300. This may be due to the flash 112 only being activated at the time $T_{flash}$ 306b prior to the desired full flash current so that the flash 112 only reaches its full flash current when the target frame (frame 3) is exposed. Thus, the active flash period 311b is reduced (as compared to the active flash period 311a of FIG. 3A), meaning less energy is wasted by the flash being at full power too early.

Figure 3C:
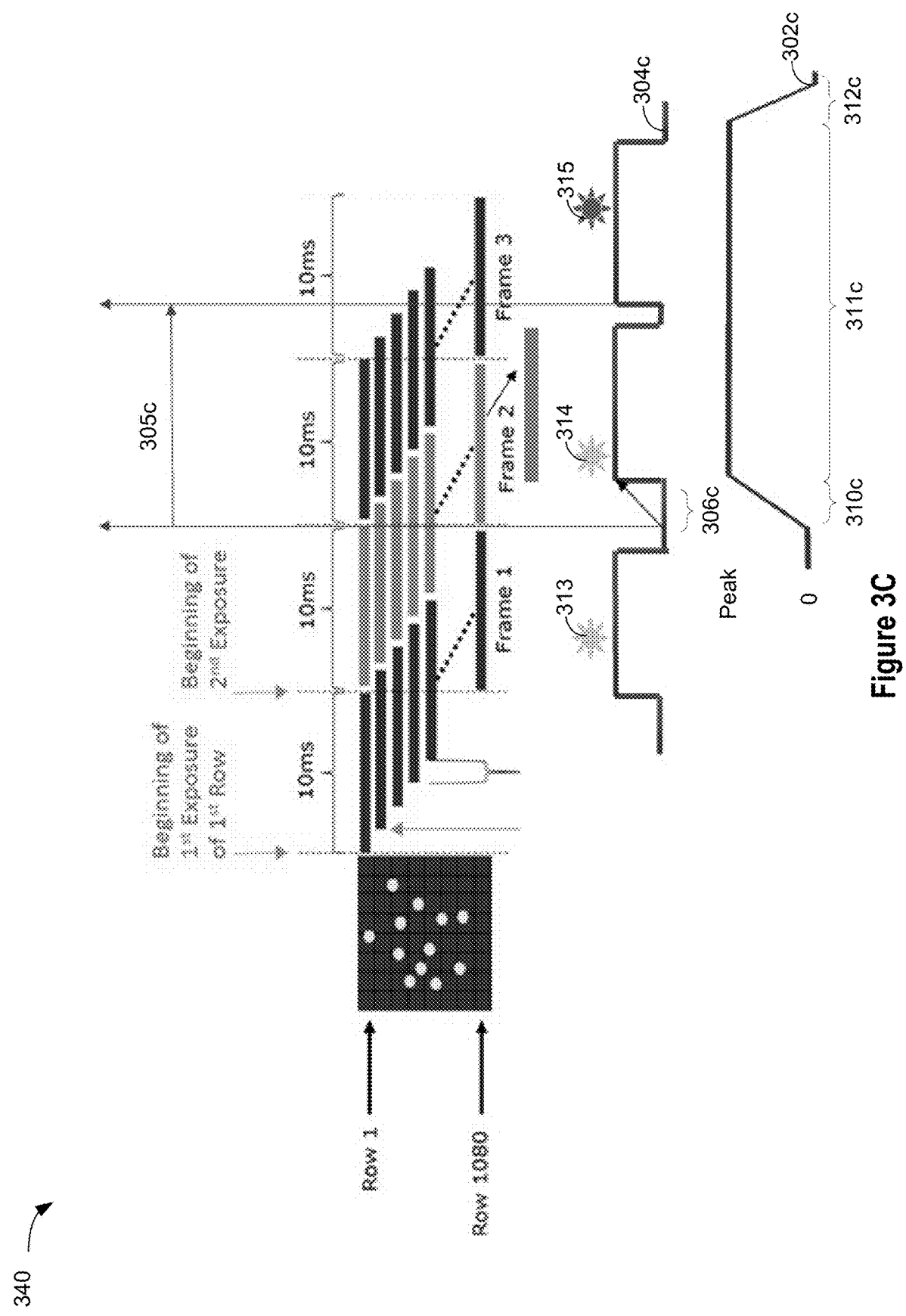
FIG. 3C illustrates an exposure and flash timing diagram for the camera of FIG. 1, where the exposure of the sensor is synchronized with the flash and the flash is synchronized with the target frame, in accordance with an exemplary embodiment.

FIG. 3C illustrates an exposure and flash timing diagram for the camera of FIG. 1, where the exposure of the sensor is synchronized with the flash and the flash is synchronized with the target frame, in accordance with an exemplary embodiment. The exposure and flash timing diagram 340 shows, similar to the diagrams 300 and 320, when a first exposure of a first row of the first frame begins and ends in association with second and third exposures of the second and third frames.

The exposure and flash timing diagram 340 also includes an LED current indicator 302c (corresponding to the LED current indicators 302a and 302b of FIGS. 3A and 3B, respectively and including a ramp-up period 310c (corresponding to the ramp-up periods 310a and 310b), an active flash period 311c (corresponding to the active flash periods 311a and 311b), and a ramp-down period 312c (corresponding to the ramp-down periods 312a and 312b)) of the flash 112 and the frame exposure signal 304c (corresponding to exposure periods of frames 2, 3, and 4) similar to diagrams 300 and 320. For sake of simplified description, such similar components and indicators will not be described again here.

The diagram 340 shows that the LED current indicator 302c and the frame exposure signal 304c indicate that the flash 112 turns on and ramps-up after both frame 1 and frame 2 are exposed and only at the time $T_{flash}$ 306c before the beginning of exposure of frame 3. Thus, a blanking period equal to the duration of the $T_{flash}$ 306c is introduced between frames 2 and 3. Accordingly, neither frames 1 nor 2 are partially exposed (as shown by the illumination indicators 313 and 314 indicating that the frames 1 and 2 are not at all illuminated but that frame 3 is fully illuminated). Thus, both frames 1 and 2 may be used for statistical analysis in capturing frame 3. Additionally, the period 305c is further reduced as compared to the diagrams 300 and 320, thus reducing a total power consumed by the flash 112. The $T_{flash}$ 306c, and thus the blanking period, is equal to the ramp-up time 310c.

As discussed herein, the creating of the blanking period may comprise interactions between one or more of the blanking control module 237, flash timing module 255, and flash control module 256 (among other components). For example, the blanking control module 237 may introduce the blanking period introduced in diagram 340 based on a $T_{flash}$ period 306c as determined by one or both of the flash timing module 255 and the flash control module 256 (e.g., based on the lookup table in the memory). The blanking module 237 may communicate the blanking period to the capture control module 235, which may delay exposure of the corresponding sensors so that the target frame (e.g., frame 3) is fully exposed.

In some embodiments, the blanking period may be determined based on one or more of: 1) the Tflash of the corresponding flash ramp-up time; 2) a sensor programmed exposure time in linecount, lc (e.g., the duration of an exposure window of a line); 3) a number of lines including vertical blanking, FLL (e.g., the frame length line); and 4) a line time for each line. In some embodiments, the frame time for each frame may be calculated according to Equation 1:

$$T_{frame} = (\text{Total number of pixels per frame/Pixel Rate}) = (vt\_pixel\_clock*4)/(FLL*line\_length\_pck) \quad \text{(Equation 1)}$$

Where:
FLL corresponds to the frame length line, measured in lines/frame;
Line_length_pck corresponds to a number of pixels per line (e.g., a length of the line in pixels), measured in pixels/line; and
Vt_pixel_clock corresponds to a clock time used for internal imaging processing as the base of integration time, frame rate, etc., measured in megahertz (MHz).

An extra number of lines (delta) corresponding to the $T_{flash}$ is determined based on Equation 1 and replacing $T_{frame}$ with $T_{flash}$, as shown in Equation 2:

$$\text{delta} = \text{ceil}[T_{flash}*\text{line\_length\_pck}/(vt\_pixel\_clock*4)] \quad \text{(Equation 2)}$$

Where:
$T_{flash}$ corresponds to the amount of time it takes for the flash module to reach desired flash power from time flash is requested;
Line_length_pck corresponds to a number of pixels per line (e.g., a length of the line in pixels), measured in pixels/line; and
Vt_pixel_clock corresponds to a clock time used for internal imaging processing as the base of integration time, frame rate, etc., measured in megahertz (MHz).

Accordingly, the blanking period $B_p$ may be determined according to Equation 3:

$$B_p = FLL + \text{delta} \quad \text{(Equation 3)}$$

Where:
FLL corresponds to the frame length line, measured in lines/frame.

FIG. 4A illustrates an example of an exposure and flash timing diagram of the camera of FIG. 2 having multiple symmetric sensors synchronized with the flash, in accordance with an exemplary embodiment. The diagram 400 shows that sensor exposure 405 corresponds to one sensor of the camera 202 (e.g., the RGB sensor 116) and that sensor exposure 410 corresponds to the other sensor of the camera 202 (e.g., the second sensor 222). Each of the exposures 405 and 410 show three frames (frames 1, 2, and 3) being exposed by each sensor, with frame 2 for both exposures 405 and 410 being fully exposed. When the RGB sensor 116 and the second sensor 222 are symmetric, the exposures of the two sensors 116 and 222 (e.g., a start of the exposures of the two sensors) may be synchronized as shown (and thus the frames 1, 2, and 3 for both exposures 405 and 410 are synchronized). Accordingly, to synchronize the two sensors 116 and 222 with the flash 112, both of the sensors 116 and 222 may have a blanking period 406 equal to a $T_{flash}$ period 402 (corresponding to the ramp-up time of the flash 112) introduced immediately before the target frame (e.g., frame 2). Accordingly, there are no partially exposed frames and only one blanking period (406) needs to be determined.

Thus, the controller or processor may synchronize the start of exposures of the RGB sensor 116 and the second sensor 222 based on the flash ramp-up time for the flash 112. Furthermore, the controller or processor may determine a blanking period of the second sensor 222 based at least in part on the flash ramp-up time of the flash 112. In some embodiments, the blanking period for the RGB sensor 116 and a blanking period of the second sensor 222 are equal when the RGB sensor 116 and the second sensor 222 are symmetric image sensors. In some embodiments, the blanking period for the RGB sensor 116 and the blanking period of the second sensor 222 are unequal when the RGB sensor 116 and the second sensor 222 are asymmetric image sensors.

FIG. 4B illustrates an example of an exposure and flash timing diagram of the camera of FIG. 2 having multiple asymmetric sensors synchronized with the flash, in accordance with an exemplary embodiment. The diagram 420 shows that sensor exposure 415 corresponds to one sensor of the camera 202 (e.g., the RGB sensor 116) and that sensor exposure 420 corresponds to the other sensor of the camera 202 (e.g., the second sensor 222). Contrary to diagram 400 and sensor exposures 405 and 410, the RGB sensor 116 and the second sensor 222 as indicated by diagram 420 are asymmetric sensors. Accordingly, the exposure windows of the RGB sensor 116 are different in duration than the exposure windows of the second sensor 222 and, thus, exposures of corresponding frames may need to be synchronized so they occur at the same time.

Each of the exposures 415 and 420 show three frames (e.g., frames 1, 2, and 3) being exposed by each sensor, with frame 2 for both exposures 415 and 420 being fully exposed. When the RGB sensor 116 and the second sensor 222 are asymmetric, the exposures of the two sensors 116 and 222 may be synchronized as shown. Accordingly, to synchronize the two sensors 116 and 222 with the flash 112, both of the sensors 116 and 222 may have different blanking periods. The RGB sensor 116 may have a blanking period 416 equal to a $T_{flash}$ period 404 (corresponding to the ramp-up time of the flash 112). However, a blanking period 421 for the second sensor 222 may account for both the $T_{flash}$ period 404 and an additional delay 422 to ensure that the corresponding frames (e.g., frame 2) are exposed synchronously. Accordingly, two blanking periods are determined based off a single $T_{flash}$ period 404 and there are no partially exposed frames and only one blanking period needs to be determined.

Figure 5:
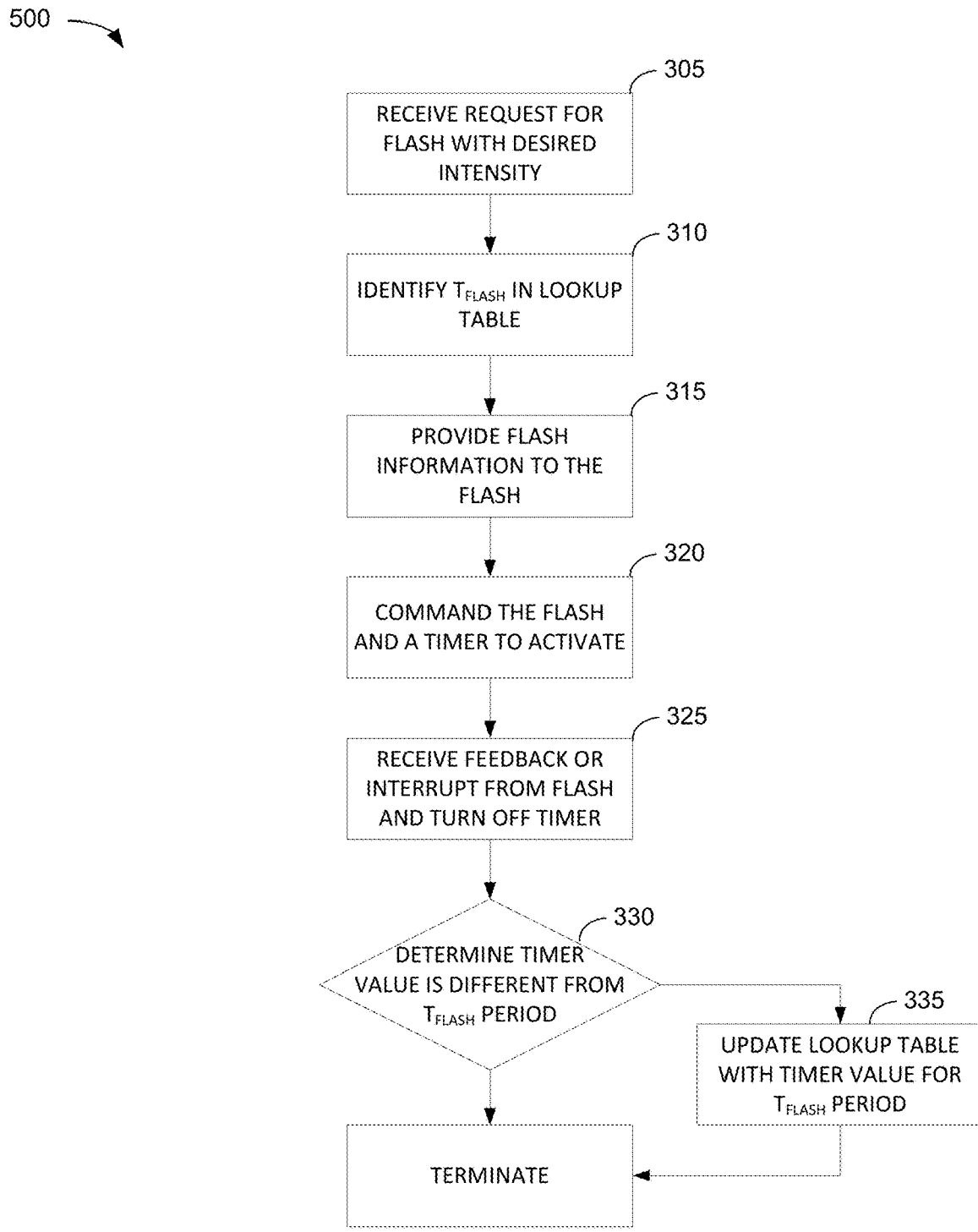
FIG. 5 is a flow diagram for a method for dynamically updating a flash ramp-up table in the camera of FIG. 2, according to an exemplary embodiment.

FIG. 5 is a flow diagram for a method for dynamically updating a flash ramp-up table in the camera of FIG. 2, according to an exemplary embodiment. The flash ramp-up time ($T_{flash}$ period) for a flash may be important to determine regardless of whether or not blanking periods are determined based on the $T_{flash}$ period. Additionally, the $T_{flash}$ period may be used to ensure that a target frame is not under exposed (e.g., by ensuring that the flash is at the proper intensity before the target frame is exposed). For example, if the $T_{flash}$ period is too short in either an open loop system with no feedback or a closed loop system with feedback, the camera 202 may capture an underexposed frame because the flash may not have been at full power when the frame exposure begins at frame capture. The closed loop system may provide a feedback indicating that the flash is at full power (e.g., when the $T_{flash}$ period ends), which may be received by the processor after frame exposure has started. The $T_{flash}$ period may also be used to ensure that a corresponding flash period (period when the flash is at full power) is terminated. For example, if the $T_{flash}$ period is too long in either the open loop system or the closed loop system, the camera 202 may keep the flash on for a longer duration than necessary, potentially wasting power and causing an excess of frames to be exposed (fully and/or partially). Accordingly, the closed loop system may use and/or autocorrect or update the $T_{flash}$ period to ensure that the camera 202 fires the flash well in advance of exposure of the frame but not too far in advance of exposure of the frame to waste an excess of power or expose improper frames. Additionally, the closed loop system may dynamically autocorrect or update the $T_{flash}$ period based on the feedback.

As described above, the $T_{flash}$ period may be determined by the flash timing module 255 based on one or more of a current draw of each element of the flash, a number of flash components (e.g., number of LEDs), and a power level of the overall system or the energy source, among others. The $T_{flash}$ period may also vary based on desired flash intensity (e.g., higher intensities may have longer $T_{flash}$ periods), target object location or distance from the camera 202, and the type of flash involved (e.g., Dual-CCT flash parameters vs. single LED flash). The $T_{flash}$ period may include the time from when the flash is initially requested to the time when a flash ramp-up done interrupt or similar feedback signal is received, where the feedback signal indicates when the flash is at the desired intensity.

In some embodiments, the $T_{flash}$ periods may be instantaneously calculated based on one or more inputs or parameters, as described above. In some embodiments, the $T_{flash}$ period may be determined using the lookup table described herein. Accordingly, one or more of the desired intensity, parameters of the flash, available power in the power source, and overall camera load may be an input to identify a $T_{flash}$ period value in the lookup table. For example, when the desired intensity requests a 750 mA flash signal and the power source has 5V of power at a 1 A current, the $T_{flash}$ period may comprise a first value. When the desired intensity requests a 1 A flash signal at the same power and current values in the power source, the $T_{flash}$ period may comprise a second value longer than the first value.

In some embodiments, the flash 112 and/or 224 may be part of a closed loop system and the camera 202 may dynamically determine $T_{flash}$ period using the flash done notification or feedback. The dynamically determine $T_{flash}$ period may be used to update a maintained initial training data set (e.g., lookup table) comprising $T_{flash}$ period for different currents. The camera 202 may continue to update the lookup table for flash ramp up on the fly for different values during the operation of the camera 202. In some embodiments, the dynamic $T_{flash}$ value can optionally be clubbed with blanking extension, meaning that some embodiments may have just the dynamic $T_{flash}$ ramp-up based on the closed loop feedback system and some embodiments may have the blanking extension/period logic to avoid preceding and successive frames but with a fixed $T_{flash}$. Some embodiments may combine the dynamic $T_{flash}$ with the blanking extension/period logic where the dynamic $T_{flash}$ may be used to determine the blanking extension/period.

The steps of the method 500 shown in FIG. 5 may obtain $T_{flash}$ values from the lookup table and may dynamically update the lookup table. In some embodiments, the method 500 may be performed by one or more of the image processor 220, the device processor 250, the dynamic update module 240, or the flash timing module 255 using one or more of the memory 230, the storage 210, and the working memory 205. At block 505, the processor or module may receive a request for a particular intensity flash. In some embodiments, the processor or module may further receive additional inputs needed to identify the $T_{flash}$ period in the lookup table (e.g., power available in power source, current camera load, etc.). In some embodiments, each of these additional inputs may be needed to identify the $T_{flash}$ period more accurately. In some embodiments, the receipt or obtaining of these additional inputs may comprise a separate block in the method (not shown). At block 510, the processor or module may utilize the received information to identify the $T_{flash}$ period in the lookup table.

At block 515, the processor or module may provide the flash intensity information to the flash (e.g., the flash 112 or 224 of FIG. 2) or the flash control module 256. The flash 112 or 224 or the flash control module 256 may use the flash intensity information to determine when the flash reaches the desired intensity and signal the ramp-up done interrupt or feedback. As part of the same block 510 or as a separate block, the processor or module may provide the $T_{flash}$ period to one of the blanking control module 237 or the capture control module 235 to control blanking of the sensors of the camera 202. At block 520, the processor or module may command the flash control module 256 to activate the flash simultaneously with activating a timer (e.g., using the internal clock 251).

At block 525, the processor or module may receive the feedback or interrupt from the flash control module 256 or the flash 112 or 224 and may simultaneously turn off the timer. At block 530, the processor or module may determine whether the value identified by the timer is different from the $T_{flash}$ period obtained from the lookup table. If the timer value is different from the $T_{flash}$ period, then, at block 535, the processor or module may update the $T_{flash}$ period in the lookup table according to current camera parameters (e.g., current camera load, current power available at power source, etc.). Once the $T_{flash}$ period is updated in the lookup table, the method 500 terminates. If the processor or module determines that the timer value is the same as the $T_{flash}$ period, then the method 500 may terminate.

Figure 6:
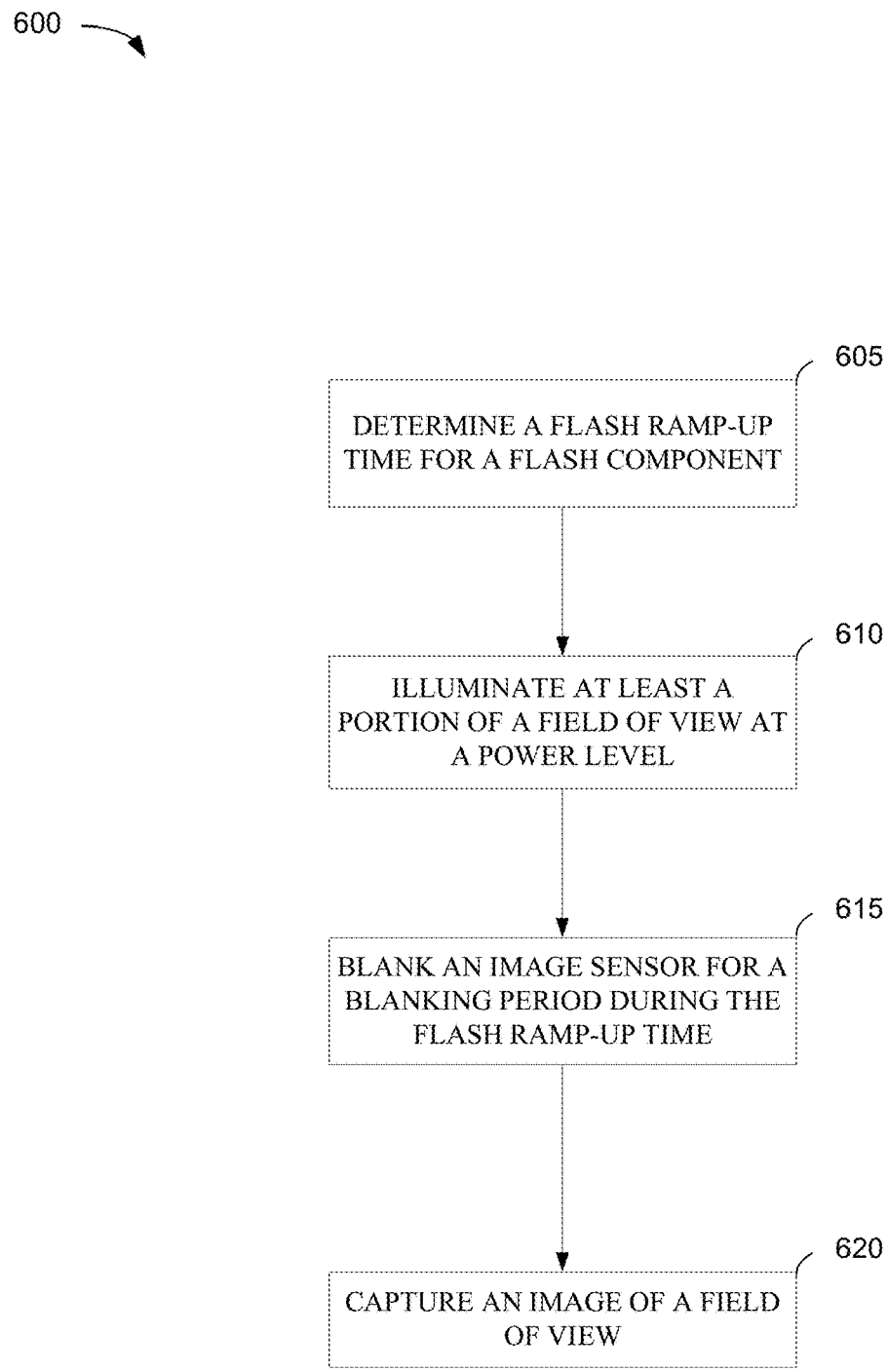
FIG. 6 is a flowchart illustrating an example of a method for controlling and synchronizing exposure and flash of the image capture device of FIG. 1, according to an exemplary embodiment.

FIG. 6 is a flowchart illustrating an example of a method 600 for controlling and synchronizing sensors and flashes in the camera of FIG. 1, according to an exemplary embodiment. For example, the method 600 could be performed by the camera 202 illustrated in FIG. 2. Method 600 may also be performed by one or more of the components of the camera 202. A person having ordinary skill in the art will appreciate that the method 600 may be implemented by other suitable devices and systems. Although the method 600 is described herein with reference to a particular order, in various implementations, blocks herein may be performed in a different order, or omitted, and additional blocks may be added.

The method 600 begins at operation block 605 with the camera 202 determining a flash ramp-up time for a flash component (e.g., the flash 112 or 224 described herein). Specifically, the camera 202 may determine an amount of time that passes between when a flash is requested from the flash component and when an interrupt is received from the flash component indicating that the flash is at the desired power. In some embodiments, the camera 202 may determine the amount of flash desired, which may impact the flash ramp-up time.

At operation block 610, the camera 202 illuminates at least a portion of a field-of-view of the camera 202 at a power level. In some embodiments, the illumination may occur during or before image capture by a sensor of the camera 202. In some embodiments, illuminating the portion of the field of view may include the flash ramp-up time determined above. In some embodiments, illuminating may also include flash ramp-down time.

At operation block 615, the camera 202 blanks an image sensor (e.g., RGB sensor 116 or second sensor 222 described herein) for a blanking period during the flash ramp-up time. In some embodiments, the blanking period may be equal to the flash ramp-up time. In some embodiments, the blanking period may comprise only a portion of the flash ramp-up time. In some embodiments, blanking the image sensor may comprise delaying an exposure of the image sensor.

At operation block 620, the camera 202 captures an image of a field of view. In some embodiments, the capturing may include reading out information from the image sensor for a frame while blanking the image sensor in preparation for the subsequent frame.

An apparatus for capturing an image may perform one or more of the functions of method 600, in accordance with certain aspects described herein. In some aspects, the apparatus may comprise various means for performing the one or more functions of methods 700 and/or 750. For example, the apparatus may comprise means for determining a flash ramp-up time for a flash component of the apparatus. In certain aspects, the means for determining a flash ramp-up time can be implemented by one or more of the image processor 220, the device processor 250, the flash 112, the capture control module 235, the flash timing module 255, or the flash control module 256 of FIG. 2. In certain aspects, the means for determining a flash ramp-up time can be configured to perform the functions of block 605 of FIG. 6. The apparatus may comprise means for illuminating at least a portion of a field of view of the apparatus. In some aspects, the means for illuminating can be implemented by the flash 112 and/or the second flash 224. In certain aspects, the means for illuminating can be configured to perform the functions of block 510 of FIG. 5. The apparatus may comprise means for blanking an image sensor of the apparatus for a blanking period during the flash ramp-up time. In certain aspects, the means for blanking can be implemented by the image processor 220, the device processor 250, and/or the blanking control module 237 of FIG. 2. In certain aspects, the means for blanking can be configured to perform the functions of block 515 of FIG. 5. The apparatus may comprise means for capturing an image of the field of view. In certain aspects, the means for capturing can be implemented by the RGB sensor 116, the second sensor 222, the image processor 220, the device processor 250, the capture control module 235, and/or the operating system 245. In certain aspects, the means for capturing can be configured to perform the functions of block 520 of FIG. 5.

Furthermore, in some aspects, the various means of the apparatus for capturing an image may comprise algorithms or processes for performing one or more functions. For example, according to these algorithms or processes, the apparatus may obtain information regarding when the flash 112 begins to ramp-up. The apparatus may further obtain information regarding when the flash 112 reaches full power (e.g., when the ramp-up is complete). This information may be used to determine, calculate, or compute the flash ramp-up time. This may apply to each of the flash components of the apparatus. The apparatus may use the determined flash ramp-up time(s) to then activate the flash 112 to illuminate a portion of the field of view. For example, the apparatus may generate a signal that is provided to the flash 112 for the duration of the flash ramp-up time. Alternatively, or additionally, separate signals may be communicated to initialize the flash 112 and then turn off the flash 112 after the ramp-up time. The apparatus may blank the RGB sensor 116 for a duration of time based on the flash ramp-up time. For example, the apparatus may command the blanking of the RGB sensor 116 to start and end according to the flash ramp-up time. The apparatus may further capture an image of the field of view. Accordingly, the various components may be commanded in proper sequencing and processing to capture an image using the RGB sensor 116 and the second sensor 222.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for capturing an image, comprising:
 a first image sensor configured to capture an image of a field of view;
 a flash component configured to illuminate at least a portion of the field of view at a power level during capture of a first frame by the first image sensor; and
 a controller configured to:
  determine an amount of time between when a flash will be requested at the power level and when a current provided to the flash component will reach a level corresponding to the requested power level; and
  control a blanking of the first image sensor for a blanking period based on the determined amount of time.

2. The apparatus of claim 1, further comprising a second image sensor configured to capture a second image of the at least a portion of the field of view, wherein the controller is further configured to:
synchronize a start of exposures of the first image sensor and the second image sensor based on the determined amount of time.

3. The apparatus of claim 2, wherein the first image sensor and the second image sensor share the flash component, and wherein a second blanking period for the second image sensor is determined based at least in part on the determined amount of time.

4. The apparatus of claim 2, wherein the first image sensor and the second image sensor are symmetrical sensors, and wherein the blanking period for the first image sensor and a second blanking period for the second image sensor are equal.

5. The apparatus of claim 2, wherein the first image sensor and the second image sensor are asymmetrical sensors, and wherein the blanking period for the first image sensor and a second blanking period for the second image sensor are unequal.

6. The apparatus of claim 1, wherein the controller is further configured to:
activate the flash component to emit a flash at a time prior to an exposure of the first frame equal to the determined amount of time.

7. The apparatus of claim 6, wherein the controller is further configured to:
cause a read out of image data from the first image sensor for a second frame during the blanking period, the second frame preceding the first frame in time.

8. The apparatus of claim 7, wherein the controller is further configured to:
activate the flash component after an end of an exposure of the second frame; and
perform statistical analysis on the second frame in preparation for exposing and reading out the first frame.

9. The apparatus of claim 1, further comprising a memory configured to store a table of flash ramp-up times as a function of flash power levels, wherein the controller is further configured to:
select the amount of time from the table of flash ramp-up times based on the requested power level; and
update the determined amount of time based on the selected amount of time and a time that passes between receipt of the flash request and receipt of an interrupt input.

10. The apparatus of claim 9, wherein the controller is further configured to:
select the amount of time from the table of flash ramp-up times based on one or more of a received flash intensity, a received available power, and one or more received flash component parameters.

11. The apparatus of claim 1, wherein the controller is further configured to:
determine a flash ramp-down time for the flash component, the flash ramp-down time corresponding to an amount of time between when the flash component produces the flash at the power level and when a power draw of the flash component falls to a predetermined value; and
determine a second blanking period for the first image sensor to blank the first image sensor according to the flash ramp-down time.

12. A method of capturing an image by a camera, comprising:
determining an amount of time between when a flash will be requested at a power level and when a current provided to the flash component will reach a level corresponding to the requested power level;
illuminating at least a portion of a field of view of the camera at the requested power level during capture of a first frame;
blanking a first image sensor of the camera for a blanking period based on the determined amount of time; and
capturing an image of the field of view.

13. The method of claim 12, further comprising:
capturing a second image of the at least a portion of the field of view via a second image sensor; and
synchronizing exposures of the first image sensor and the second image sensor based on the determined amount of time.

14. The method of claim 13, further comprising determining a blanking period for the second image sensor based at least in part on the determined amount of time of the flash component, wherein the first image sensor and the second image sensor share the flash component.

15. The method of claim 13, wherein the first image sensor and the second image sensor are symmetrical sensors, and wherein the blanking period for the first image sensor and a second blanking period for the second image sensor are equal.

16. The method of claim 13, wherein the first image sensor and the second image sensor are asymmetrical sensors, and wherein the blanking period for the first image sensor and a second blanking period for the second image sensor are unequal.

17. The method of claim 12, further comprising:
activating the flash component to emit a flash at a time prior to an exposure of a first frame equal to the determined amount of time.

18. The method of claim 17, further comprising:
causing a read out of image data from the first image sensor for a second frame during the blanking period, the second frame preceding the first frame in time.

19. The method of claim 18, further comprising:
activating the flash component after an end of an exposure of the second frame; and
performing statistical analysis on the second frame in preparation for exposing and reading out the first frame.

20. The method of claim 12, further comprising:
storing a table of flash ramp-up times as a function of flash power levels;
selecting the amount of time from the table of flash ramp-up times based on the requested power level; and
updating the determined amount of time based on the selected amount of time and a time that passes between receipt of a flash request and receipt of an interrupt input.

21. The method of claim 20, further comprising:
selecting the amount of time from the table of flash ramp-up times based on one or more of a received flash intensity, a received available power, and one or more received flash component parameters.

22. The method of claim 12, further comprising:
determining a flash ramp-down time for the flash component, the flash ramp-down time corresponding to an amount of time between when the flash component produces the flash at the power level and when a power draw of the flash component falls to a predetermined value; and determining a second blanking period for the first image sensor to blank the first image sensor according to the flash ramp-down time.

23. An apparatus for capturing an image, comprising:
means for determining an amount of time between when a flash will be requested at a power level and when a current provided to the flash component will reach a level corresponding to the requested power level;
means for illuminating at least a portion of a field of view of the apparatus at the requested power level during capture of a first frame;
means for blanking a first image sensor of the apparatus for a blanking period based on the determined amount of time; and
means for capturing an image of the field of view.

24. The apparatus of claim 23, further comprising:
means for capturing a second image of the at least a portion of the field of view via a second image sensor; and
means for synchronizing exposures of the first image sensor and the second image sensor based on the determined amount of time.

25. The apparatus of claim 24, further comprising:
means for determining a blanking period for the second image sensor based at least in part on the determined amount of time of the means for illuminating, wherein the first image sensor and the second image sensor share the means for illuminating.

26. The apparatus of claim 24, wherein the first image sensor and the second image sensor are symmetrical sensors and wherein the blanking period for the first image sensor and a second blanking period for the second image sensor are equal.

27. The apparatus of claim 24, wherein the first image sensor and the second image sensor are asymmetrical sensors and wherein the blanking period for the first image sensor and a second blanking period for the second image sensor are unequal.

28. The apparatus of claim 23, further comprising:
means for activating the means for illuminating to emit a flash at a time prior to an exposure of a first frame equal to the determined amount of time.

29. The apparatus of claim 28, further comprising:
means for causing a read out of image data from the first image sensor for a second frame during the blanking period, the second frame preceding the first frame in time.

30. A non-transitory computer-readable storage medium comprising instructions that, when executed by one or more processors of an apparatus, cause the apparatus to:
determine an amount of time between when a flash will be requested at a power level and when a current provided to the flash component will reach a level corresponding to the requested power level;
illuminate at least a portion of a field of view of the apparatus at the requested power level during capture of a first frame;
blank an image sensor of the apparatus for a blanking period based on the determined amount of time; and
capture an image of the field of view.

31. The apparatus of claim 1, wherein the controller is further configured to:
determine the amount of time as a function of the requested power level.

32. The apparatus of claim 1, wherein the controller is further configured to:
update the determined amount of time based on a duration between receipt of the flash request and receipt of an interrupt input.

* * * * *